US006038754A

United States Patent [19]

Stafford

[11] Patent Number: 6,038,754

[45] Date of Patent: Mar. 21, 2000

[54] NUT REMOVAL AND INSTALLATION TOOL

[75] Inventor: Jay M. Stafford, Huntington Beach, Calif.

[73] Assignee: Fairchild Holding Corp., Dulles, Va.

[21] Appl. No.: 08/990,677

[22] Filed: Dec. 15, 1997

[51] Int. Cl.[7] ...................................................... B23P 19/04

[52] U.S. Cl. ................................................ 29/267; 254/25

[58] Field of Search .............................. 81/3.55; 254/131, 254/25; 29/267; 7/166

[56] References Cited

U.S. PATENT DOCUMENTS

| | | | |
|---|---|---|---|
| 3,495,284 | 2/1970 | Weingardt | 81/3.55 |
| 4,089,077 | 5/1978 | Morton | 7/166 |
| 4,625,945 | 12/1986 | Hearn et al. | 254/25 |
| 5,079,791 | 1/1992 | Grech | 29/267 |
| 5,435,030 | 7/1995 | Phillips | 7/166 |

*Primary Examiner*—Robert C. Watson
*Attorney, Agent, or Firm*—Irving Keschner

[57] ABSTRACT

A tool which has the capability of removing the nut from both large and small nut plate assemblies, the tool also including a portion for installing a nut into the plate assembly cage. The tool comprises a handle having a removal nose portion at one end and a threaded shaft portion for receiving a reinstallation socket at the other end. In a preferred embodiment, the portion of the handle incorporating the removal nose portion is angled with respect to the remaining portion of the handle. The reinstallation socket has a threaded aperture for receiving the thread shaft portion, therefor securing the socket to the tool. The nose portion has an upper jaw portion separated from a lower jaw portion by an opening. The upper jaw portion is used to pry open the nut plate cage and the lower jaw portion pushes and lifts the nut from the cage. The space between the two jaw portions enables a pivoting action around the pried open cage wall.

5 Claims, 3 Drawing Sheets

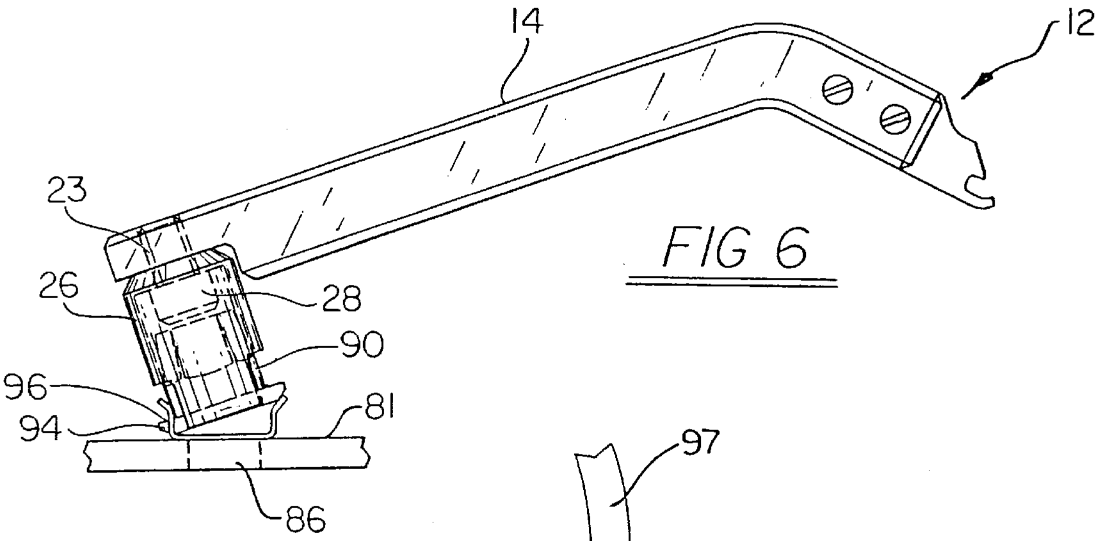
FIG 6
97
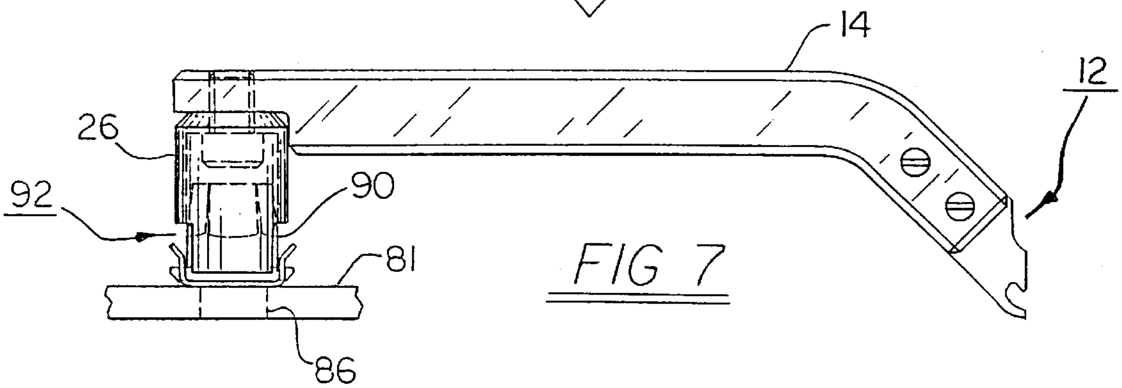
FIG 7
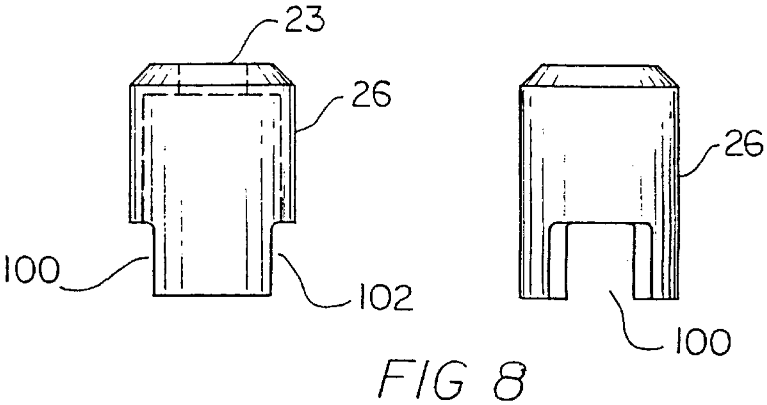
FIG 8
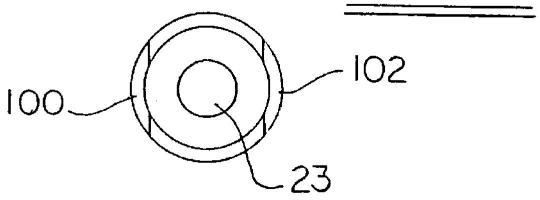

NUT REMOVAL AND INSTALLATION TOOL

BACKGROUND OF INVENTION

1. Field of the Invention

The present invention relates to a tool for removing a nut from a nut plate assembly.

2. Description of the Prior Art

Plate nut assemblies, of the type shown in U.S. Pat. No. 5,137,406, include nuts that are replaceable. Currently, special tools are necessary to remove the nuts from their cages. Small nut plates with thin-walled cages require a tool which can reach inside the assembly, pry open the cage and force the nut out. Larger nut plate assemblies with thick-walled cages require greater prying force, thus necessitating a stronger, thicker tool. However, thicker tools cannot fit inside the nut plate assembly. In addition, the prior art requires a separate tool for installing nuts in the cage portion of the nut assembly, thus in turn increasing the cost of the maintaining and servicing the assembly.

What is thus desired is to provide a single tool for use with both small and large nut plate assemblies wherein the tool can remove the nut while positioned outside the nut plate assembly cage.

SUMMARY OF THE PRESENT INVENTION

The present invention provides a single tool which has the capability of removing the nut from both large and small nut plate assemblies and wherein the tool also includes a portion for installing a nut into the plate assembly cage.

The tool comprises a handle having a nose portion at one end and a threaded shaft portion for receiving a reinstallation socket at the other end. In a preferred embodiment, the portion of the handle incorporating the removal nose portion is angled with respect to the remaining portion of the handle. The reinstallation socket has a threaded aperture for receiving the thread shaft portion, therefor securing the socket to the tool. Various sized sockets can be mounted to the tool. The nose portion has an upper jaw portion separated from a lower jaw portion by an opening. The upper jaw portion is used to pry open the nut plate cage and the lower jaw portion pushes and lifts the nut from the cage. The space between the two jaw portions enables a pivoting action around the pried open cage wall.

The present invention thus provides a tool for both removing a nut from a nut cage assembly and thereto reinstalling the same or different nut, the combination tool being relatively simple to use and inexpensive to fabricate and being capable of use for nuts of various thicknesses.

BRIEF DESCRIPTION OF THE DRAWINGS

For a better understanding of the invention, as well as other objects and further features thereof, reference is made to the following description which is to be read in conjunction with the accompanying drawing wherein:

FIGS. 6 and 7 illustrate how the socket end portion of the installation tool is used to install a nut into its associated receptacle; and FIG. 8 illustrates a socket utilized to install a nut in its associated receptacle.

DESCRIPTION OF THE INVENTION

Figure 1:
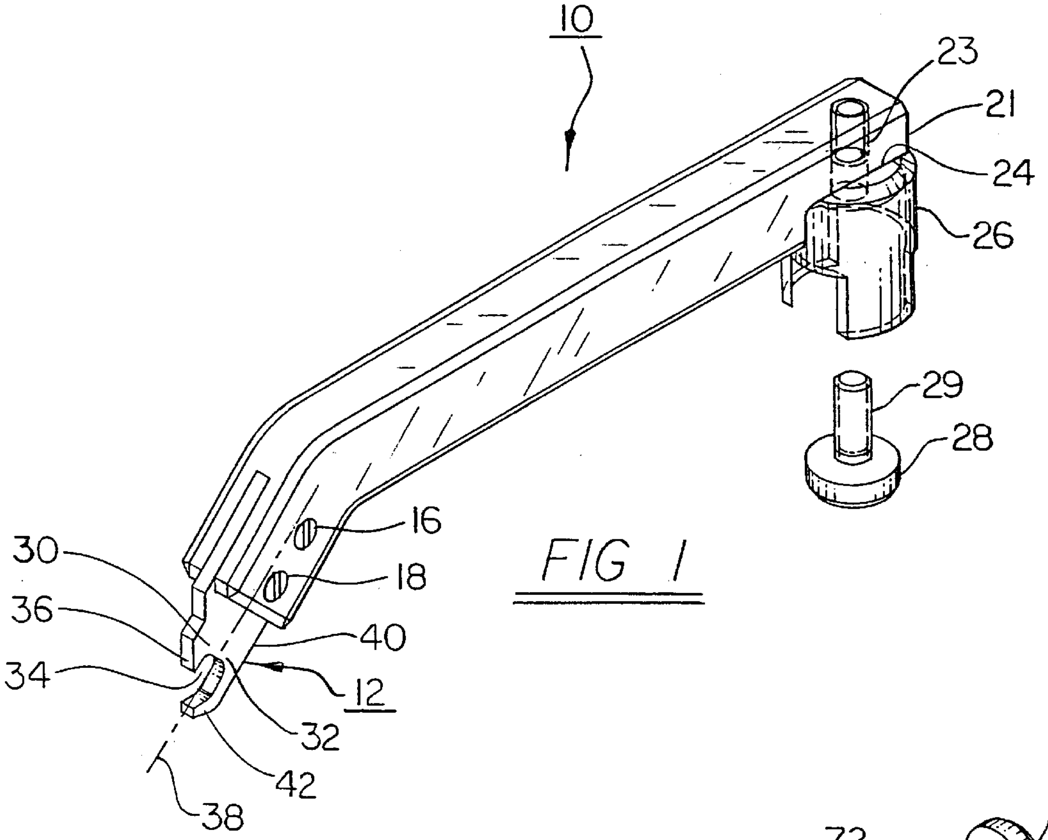
FIG. 1 is a perspective view of one embodiment of the installation/removal tool of the present invention.

Referring now to FIG. 1, a first embodiment of the removal/installation tool 10 of the present invention is illustrated. Tool 10 comprises a nose portion 12 mounted to handle 14 via fasteners, such as pins, 16 and 18. Handle 14, in the embodiment illustrated, includes an angled or bent, portion 20 in which nose portion 12 is mounted. The angled portion 20 enables tool 10 to be used in limited access areas where the nut plate assembly 50 (see FIGS. 4 and 5) is mounted.

The other end 21 of handle 14 has a threaded aperture 23 formed in cutout portion 24. A socket member 26 is positioned in cutout portion 24 as illustrated and secured to handle 14 by screw, or fastener, 28 having a threaded portion 29 (fastener 28 is shown removed from aperture 23 for purposes of clarity). It should be noted that a threaded post extending from end 21 can be used instead of aperture 23, a corresponding threaded aperture being formed in socket 26, thus eliminating the need for separate fastener 28.

Figure 3:
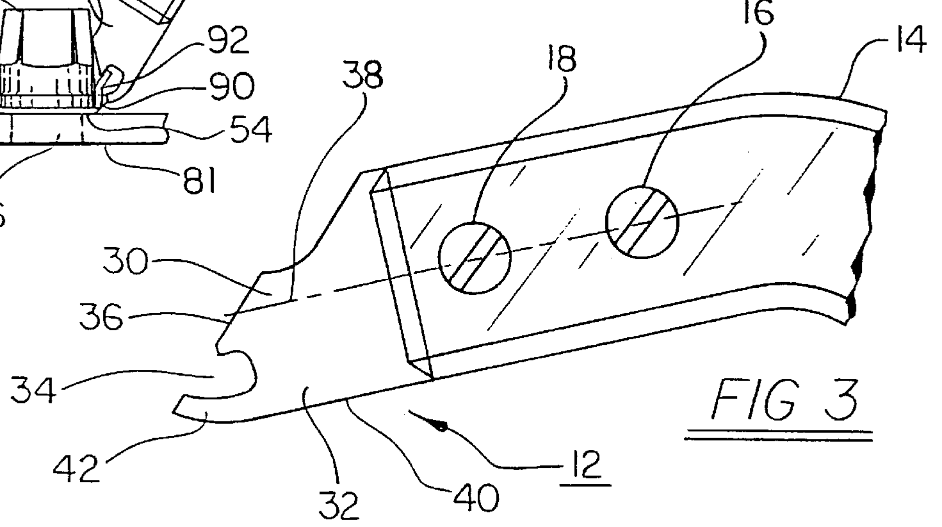
FIG. 3 is an elevation view illustrating in more detail the tool nose of the present invention.

Nose portion 12, shown in more detail in FIG. 3, comprises upper jaw portion 30 and lower jaw portion 32, jaw portions 30 and 32 being separated by opening 34. Upper jaw portion 32 comprises portion 36 extending at an angle to longitudinal axis 38 of nose portion 12 and lower jaw portion 32 comprises a portion 40 substantially parallel to axis 38 and a portion 42 which extends upwardly at an angle to axis 38.

As will be explained hereinafter in more detail, nose portion 12 is designed to remove nut 52 from cage 54 quickly and efficiently (see FIGS. 4 and 5).

Figure 2:
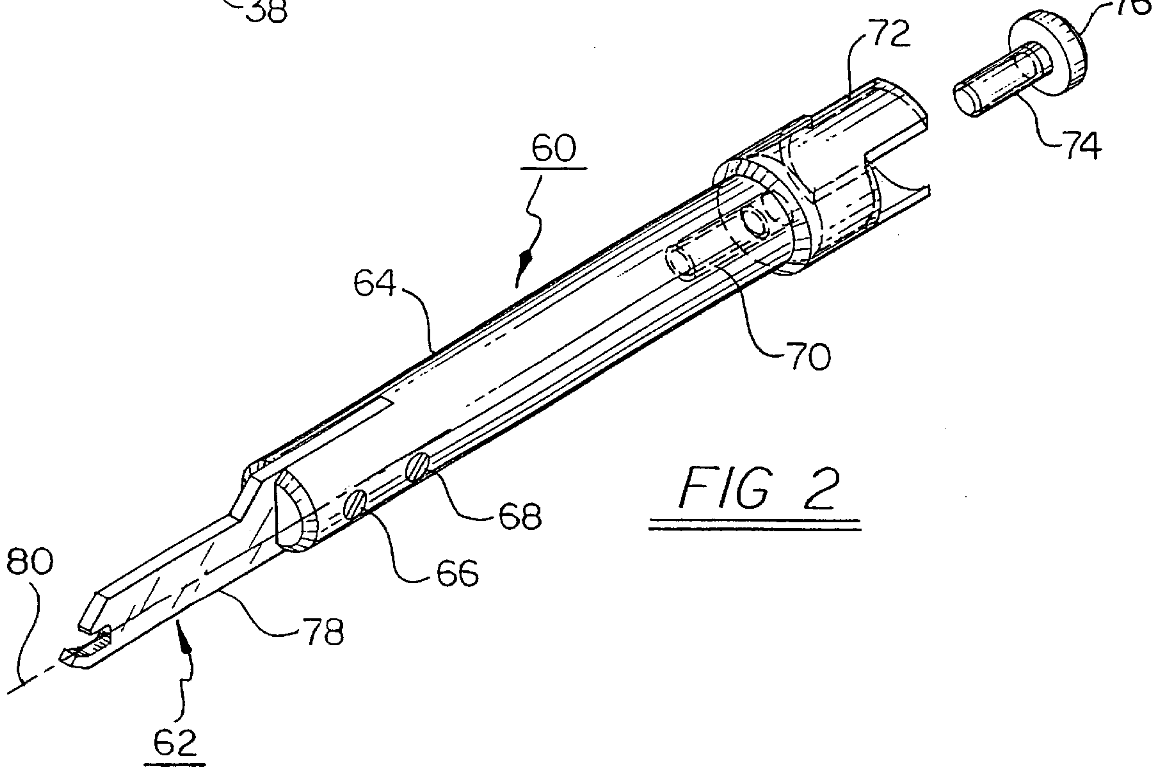
FIG. 2 is a perspective view of a second embodiment of the installation/removal tool of the present invention.

Referring to FIG. 2, a second embodiment 60 of the removal/installation tool of the present invention is illustrated Tool 60 comprises nose portion 62, connected to one end of handle 64 via fasteners, such as pins, 66 and 68. The other end of handle 64 has a threaded aperture 70 formed therein. A removable socket 72 is secured to handle 64 via threaded fastener 74, fastener 74 being threaded into aperture 70 in a manner such that head 76 of fastener 74 secures socket 72 to handle 64. As discussed with reference to the embodiment shown in FIG. 1, socket 72 can be secured to handle 64 using a threaded post fastened to the handle end, the threaded post being secured within a threaded aperture formed in socket 72. Nose portion 62 is essentially identical in construction to nose portion 12 of FIG. 1 with the exception that shank portion 78 is longer than the corresponding shank portion of nose portion 12. As illustrated, nose portion 62 and socket 72 are aligned along the longitudinal axis 80 of tool 60.

Figure 4:
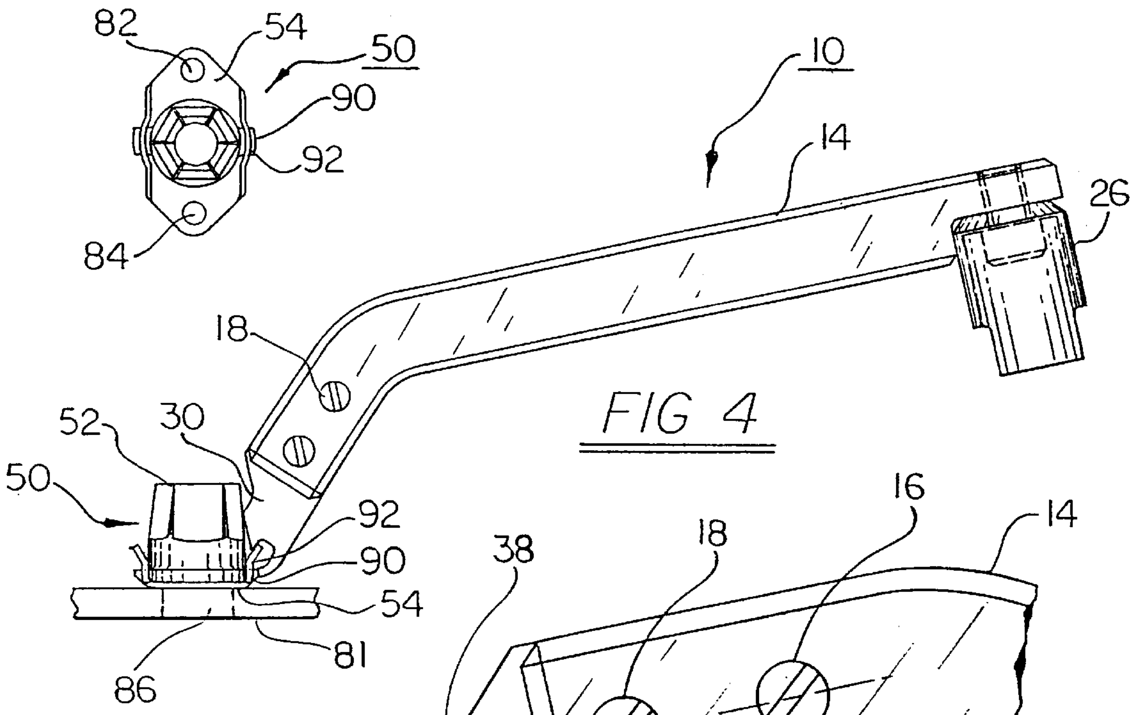
FIGS. 4 and 5 illustrate how the nose tool portion is utilized to remove a nut from its receptacle.
Figure 5:
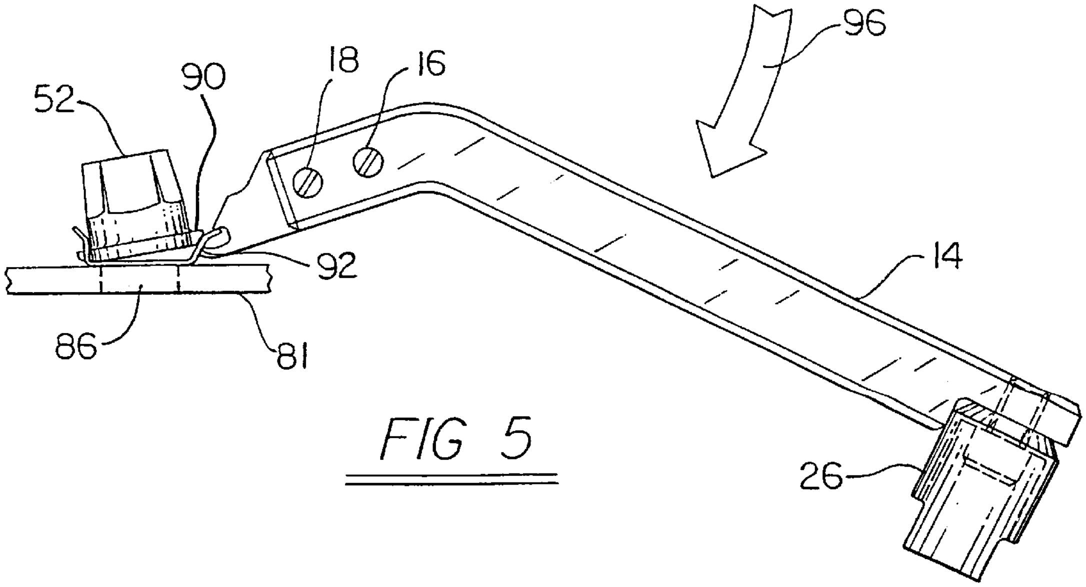

FIGS. 4 and 5 illustrate the steps used to remove nut 52 from cage 54 in nut plate assembly 50. Although tool 10 is illustrated, it is to be understood that tool 60 may be utilized instead. As illustrated, assembly 50 is secured to panel 81 via rivets 82 and 84, for example. Aperture 86 in panel 81 is adapted to receive a threaded bolt (not shown).

In order to remove nut 52 from cage 54, the upper jaw portion 30 is inserted between nut 52 and cage 54 with the lower jaw portion 32 contacting nut tab 90 which protrudes from cage window, or opening, 92. Downward pressure is then applied to handle 14 in the direction of arrow 96, upper jaw portion 30 prying open cage 54 and simultaneously pushing and lifting nut 52 through cage window 92 with tool lower jaw 32 releasing nut 52 from cage 54.

The height of the nose, or removal tool, portion 12 is designed to be suitable to fit into an ergonomically sized handle 14. Angled to the longitudinal axis 38, the upper jaw portion 36 is designed so that the angle portion does not contact the nut 52 until insertion of the upper jaw point between nut 52 and cage 54 begins. During the insertion process, the angle portion contacts nut 52 which moves, or floats, within cage 54. The angle portion pushes nut 52 away from cage 54 enabling the upper jaw point to insert itself sufficiently deep to contact enough of the cage wall to begin the prying process.

The lower jaw portion 42 extends sufficiently forward of the upper jaw portion so that, as the upper jaw pries open the wall of cage 54, the lower jaw, using a pivoting action, contacts the nut tab 90 protruding through cage window 92 and pushes nut tab 90 through cage window 92. The upward curvature of lower jaw portion 42 is designed so that the lower jaw 42 will, upon contacting and pushing nut tab 90 through window 92, also provide a lifting action, thereby simultaneously pushing and lifting nut 52 from cage 54.

The opening 34 between upper jaw portions 36 and lower jaw portion 42 is sufficiently large to enable both jaw portions to partially encompass the cage sidewall portion between the top of the sidewall and window 92. The height and depth of opening 34 allows nose portion 12 to pivot in the prying, pushing and lifting motion about the sidewall portion of cage 54 between the top of the sidewall portion and window 92 in the direction of arrow 96.

FIGS. 6 and 7 illustrate the steps utilized to insert a nut 90 (either nut 52 or a replacement nut) to form nut plate assembly 92. In this case, the position of handle 14 is reversed. As set forth with respect to FIG. 1, socket 26 is first secured to the other end of tool 10 by fastener 28. Nut 90 is then positioned in cage 54 with one nut tab 94 engaged through a corresponding cage window 96. The socket bearing tool end is positioned over nut 90 such that the nut tabs protrude through and are centered in the slots of the installation socket. Nut 90 is snapped into cage 54 by applying pressure to tool handle 14 in the direction of arrow 97 as shown in FIG. 7.

FIG. 8 illustrates three views of the novel socket 26 of the present invention (note that the sockets used in either embodiment are identical and are designed in variable sizes to accommodate various sized nuts). Socket 26 is made of metal and has a cylindrical shape. Two cutout portions, or slots, 100 and 102 are formed in the end of the socket 26 which first engages the nut to be installed.

The present invention thus provides a combined installation/removal tool for use with plate nut assemblies of various sizes which is relatively inexpensive and wherein the labor costs associated with installing/removing nuts is substantially reduced.

While the invention has been described with reference in its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A tool for removing a nut retained in a cage member, the cage member being secured to a substrate which has a bolt fastened thereto, the cage member retaining said nut in a manner so that it can threadably receive and secure the bolt, the tool comprising a handle having a longitudinal axis and a nose portion secured to a first end thereof and a receiving member at a second end thereof, said receiving member being adapted to secure a socket member to said handle, said receiving member comprising a threaded post member and said socket member has a threaded aperture formed therein, said nose portion having upper and lower jaw portions, said cage member having a plurality of windows for receiving tabs formed on said nut, the upper jaw of said nose portion being adapted to be positioned between the nut and cage member whereby said lower jaw portion contacts one of said tabs protruding from said upper jaw portion to pry open said cage member, the lower jaw portion simultaneously pushing and lifting the nut through the cage window thus releasing the nut from said cage member.

2. The tool of claim 1 wherein said threaded post member is threaded into the aperture formed in said socket member whereby said socket member is secured to said tool handle.

3. The tool of claim 1 wherein said socket member is positioned over a nut, a nut tab extending through a cage window, movement of said tool in a first direction causing said nut to snap into said cage.

4. A tool for removing a nut retained in a cage member, the cage member being secured to a substrate which has a bolt fastened thereto, the cage member retaining said nut in a manner so that it can threadably receive and secure the bolt, the tool comprising a handle having a longitudinal axis and a nose portion secured to a first end thereof and a receiving member having a longitudinal axis at a second end thereof, said first handle end being formed at an angle to the longitudinal axis of said handle, said nose portion having upper and lower jaw portions, said cage member having a plurality of windows for receiving tabs formed on said nut, the upper jaw of said nose portion being adapted to be positioned between the nut and cage member whereby said lower jaw portion contacts one of said tabs protruding from said cage window, downward pressure on said tool handle causing said upper jaw portion to pry open said cage member, the lower jaw portion simultaneously pushing and lifting the nut through the cage window thus releasing the nut from said cage member.

5. A tool for removing a nut retained in a cage member, the cage member being secured to a substrate which has a bolt fastened thereto, the cage member retaining said nut in a manner so that it can threadably receive and secure the bolt, the tool comprising a handle having a longitudinal axis and a nose portion secured to a first end thereof and a receiving member having a longitudinal axis at a second end thereof, said first handle end having a slot formed therein, said nose portion being secured within said slot to said handle, said nose portion having upper and lower jaw portions, said cage member having a plurality of windows for receiving tabs formed on said nut, the upper jaw of said nose portion being adapted to be positioned between the nut and cage member whereby said lower jaw portion contacts one of said tabs protruding from said cage window, downward pressure on said tool handle causing said upper jaw portion to pry open said cage member, the lower jaw portion simultaneously pushing and lifting the nut through the cage window thus releasing the nut from said cage member.

* * * * *